United States Patent
Srinivasan et al.

(10) Patent No.: US 9,209,690 B2
(45) Date of Patent: Dec. 8, 2015

(54) SPREAD-SPECTRUM SWITCHING REGULATOR FOR ELIMINATING MODULATION RIPPLE

(71) Applicant: CIREL SYSTEMS PRIVATE LIMITED, Bangalore (IN)

(72) Inventors: Chakravarthy Srinivasan, Bangalore (IN); Pawan Gupta, Bangalore (IN); Saumitra Singh, Bangalore (IN)

(*) Notice: Subject to any disclaimer, the term of this patent is extended or adjusted under 35 U.S.C. 154(b) by 86 days.

(21) Appl. No.: 13/769,847

(22) Filed: Feb. 19, 2013

(65) Prior Publication Data
US 2014/0091774 A1 Apr. 3, 2014

(30) Foreign Application Priority Data
Oct. 1, 2012 (IN) .............................. 4088/CHE/2012

(51) Int. Cl.
*H02M 3/158* (2006.01)
*G05F 1/46* (2006.01)

(52) U.S. Cl.
CPC ................ *H02M 3/158* (2013.01); *G05F 1/468* (2013.01)

(58) Field of Classification Search
CPC ...................................................... H02M 3/158
USPC ................... 323/284, 285, 288; 327/133, 134
See application file for complete search history.

(56) References Cited

U.S. PATENT DOCUMENTS

| | | | | |
|---|---|---|---|---|
| 6,107,862 A * | 8/2000 | Mukainakano et al. | ....... | 327/536 |
| 7,583,120 B2 * | 9/2009 | Rice | ............................... | 327/172 |
| 8,040,122 B2 * | 10/2011 | Chang et al. | .................. | 323/288 |
| 8,451,629 B2 * | 5/2013 | Adragna | .................... | 363/21.02 |
| 2008/0062731 A1 * | 3/2008 | Chang et al. | .................... | 363/78 |
| 2011/0068763 A1 * | 3/2011 | Chang et al. | .................. | 323/288 |
| 2011/0101937 A1 * | 5/2011 | Dobkin et al. | ................ | 323/282 |
| 2012/0268095 A1 * | 10/2012 | Wu | ............................... | 323/285 |
| 2014/0002043 A1 * | 1/2014 | Li et al. | ......................... | 323/282 |

* cited by examiner

*Primary Examiner* — Nguyen Tran
*Assistant Examiner* — Kyle J Moody
(74) *Attorney, Agent, or Firm* — Heena N. Kampani; Law Office of Heena N. Kampani (57) ABSTRACT

A spread-spectrum switching regulator for eliminating modulation ripple includes high gain amplifier that is responsive to reference voltage and feedback voltage of feedback loop to generate differential voltage, the feedback voltage being one of output voltage of the spread-spectrum switching regulator and a fraction of the output voltage; compensation circuit, coupled to the high gain amplifier, that maintains stability of the feedback loop to generate error level voltage in response to differential voltage; ramp generator that generates ramp waveform with slope adaptable to switching frequency to maintain duty cycle at constant value; pulse width modulator, coupled to compensation circuit and ramp generator, that compares error level voltage and ramp waveform to generate pulsed waveform; driver circuit, coupled to pulse width modulator, that drives the pulsed waveform to alternately switch a pair of transistors; and LC network, coupled to the pair of transistors, to average pulsed waveform to the output voltage.

18 Claims, 7 Drawing Sheets

SPREAD-SPECTRUM SWITCHING REGULATOR FOR ELIMINATING MODULATION RIPPLE

REFERENCE TO PRIORITY APPLICATION

This application claims priority from Indian Application No. 4088/CHE/2012 filed in India on Oct. 1, 2012, entitled "SPREAD-SPECTRUM SWITCHING REGULATOR FOR ELIMINATING MODULATION RIPPLE", which is incorporated herein by reference in its entirety.

TECHNICAL FIELD

Embodiments of the disclosure relate to a spread-spectrum switching regulator for eliminating modulation ripple.

BACKGROUND

Currently, stepping down or stepping up of DC voltages is a routine procedure in electronics. A high input voltage is usually stepped down to a low output voltage by converting the high input voltage to a pulsed waveform and vice versa. The pulsed waveform has a duty cycle equal to ratio of the low output voltage to the high input voltage, and an average value equal to a desired output voltage. The pulsed waveform is further averaged to an approximately constant voltage level by using an LC network.

In one example, the high input voltage of 10V is to be stepped down to the low output voltage of 1 V. The high input voltage is first converted to a series of pulses, each pulse with amplitude 10V and with duty cycle=1 V/10 V=10%. A resulting pulsed waveform is then converted to the approximately constant voltage level of 1 V by the LC network. However, filtering performed by the LC network is limited by a finite value of inductor and capacitor components, thereby resulting in an output voltage being an alternating waveform with ripple at a switching rate. When viewed in Fourier domain, the ripple manifests itself as an undesired tone at a switching frequency (Fsw) of the pulsed waveform. When the alternating waveform with ripple supplies other electronic equipment, non-linearities in such electronic equipment magnify effect of the ripple and introduce one or more of interference and noise. In the Fourier domain, the undesired tone is referred to as spurious emission or a spur, and difference in amplitude between a DC component and the spur is referred to as spur-free dynamic range (SFDR). The SFDR can be increased if ripple can be minimized. The SFDR can be increased by continuously modulating the switching frequency Fsw between (Fsw−δFsw) and (Fsw+δFsw), also referred to as spread-spectrum switching regulation. A switching regulator which modulates the switching frequency Fsw between (Fsw−δFsw) and (Fsw+δFsw), as described above, is referred to as spread spectrum switching regulator.

Modulation rate can be defined as a rate at which the switching frequency is varied from (Fsw−δFsw) to (Fsw+δFsw). If the modulation rate is faster than bandwidth of a switching regulator, then a feedback loop of the switching regulator would not be able to correct for changes occurring due to modulation of duty cycle by changing the switching frequency. For example, in implementations of pulse width modulation (PWM) with constant slope ramp, modulating the switching frequency also changes the duty cycle of the pulsed waveform. As the duty cycle determines the output voltage periodic movement of the switching frequency Fsw between (Fsw−δFsw) and (Fsw+δFsw) cause the output voltage to have an alternating waveform with modulation ripple at the modulation rate.

The modulation rate is hence set to a frequency much lower than bandwidth of the switching regulator. However, a low modulation rate can have an adverse effect of having spurs in an audible band spectrum. Hence, sensitivity to such low frequency spurs is increased due to the low modulation rate of spread spectrum.

In light of the foregoing discussion, there is a need for a method and system to eliminate modulation ripple using a spread-spectrum switching regulator, in one example a buck regulator, while achieving high SFDR and to maintain duty cycle at a constant value.

SUMMARY

An example of a spread-spectrum switching regulator for eliminating modulation ripple includes a high gain amplifier that is responsive to a reference voltage and a feedback voltage from a feedback loop to generate a differential voltage. The feedback voltage is one of an output voltage of the spread-spectrum switching regulator a fraction of the output voltage. The spread-spectrum switching regulator also includes a compensation circuit, coupled to the high gain amplifier, that maintains stability of the feedback loop to generate an error level voltage in response to the differential voltage. The spread-spectrum switching regulator further includes a ramp generator that generates a ramp waveform with a slope adaptable to a switching frequency to maintain duty cycle at a constant value. The spread-spectrum switching regulator also includes a pulse width modulator, coupled to the compensation circuit and the ramp generator, that compares the error level voltage and the ramp waveform to generate a pulsed waveform. Further, the spread-spectrum switching regulator includes a driver circuit, coupled to the pulse width modulator, that drives the pulsed waveform to alternately switch a pair of transistors. Moreover, the spread-spectrum switching regulator includes an LC network, coupled to the pair of transistors, to average the pulsed waveform to the output voltage.

Another example of a spread-spectrum switching regulator for eliminating modulation ripple includes a high gain amplifier that is responsive to a reference voltage and a feedback voltage from a feedback loop to generate a differential voltage. The feedback voltage is one of an output voltage of the spread-spectrum switching regulator fraction of the output voltage. The spread-spectrum switching regulator also includes a compensation circuit, coupled to the high gain amplifier, that maintains stability of the feedback loop to generate an error level voltage in response to the differential voltage. The spread-spectrum switching regulator further includes a ramp generator that generates a ramp waveform having one of the error level voltage and a pedestal voltage adjustable to variations in switching frequency and ramp amplitude to maintain duty cycle at a constant value. The spread-spectrum switching regulator also includes a pulse width modulator, coupled to the compensation circuit and the ramp generator, that compares the error level voltage and the ramp waveform to generate a pulsed waveform. Further, the spread-spectrum switching regulator includes a driver circuit, coupled to the pulse width modulator, that drives the pulsed waveform to alternately switch a pair of transistors. Moreover, the spread-spectrum switching regulator includes an LC network, coupled to the pair of transistors, to average the pulsed waveform to the output voltage.

Another example of a method of eliminating modulation ripple in a spread-spectrum switching regulator includes comparing a reference voltage and a feedback voltage from a feedback loop to generate a differential voltage. The feedback voltage is one of an output voltage of the spread-spectrum switching regulator a fraction of the output voltage. The method also includes maintaining stability of the feedback loop to generate an error level voltage in response to the differential voltage. The method further includes generating a ramp waveform having one of the error level voltage and a pedestal voltage adjustable to variations in switching frequency and ramp amplitude to maintain duty cycle at a constant value. Further, the method includes comparing the error level voltage and the ramp waveform to generate a pulsed waveform. The method includes driving the pulsed waveform to alternately switch a pair of transistors. Moreover, the method includes averaging the pulsed waveform to the output voltage.

Another example of a method of eliminating modulation ripple in a spread-spectrum switching regulator includes comparing a reference voltage and a feedback voltage from a feedback loop to generate a differential voltage. The feedback voltage is one of an output voltage of the spread-spectrum switching regulator a fraction of the output voltage. The method also includes maintaining stability of the feedback loop to generate an error level voltage in response to the differential voltage. The method further includes generating a ramp waveform having one of the error level voltage and a pedestal voltage adjustable to variations in switching frequency and ramp amplitude to maintain duty cycle at a constant value. Further, the method includes comparing the error level voltage and the ramp waveform to generate a pulsed waveform. The method includes driving the pulsed waveform to alternately switch a pair of transistors. Moreover, the method includes averaging the pulsed waveform to the output voltage.

Further features and advantages of embodiments of the present subject matter, as well as the structure and operation of preferred embodiments disclosed herein, are described in detail below with reference to the accompanying exemplary drawings.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Figure 1:
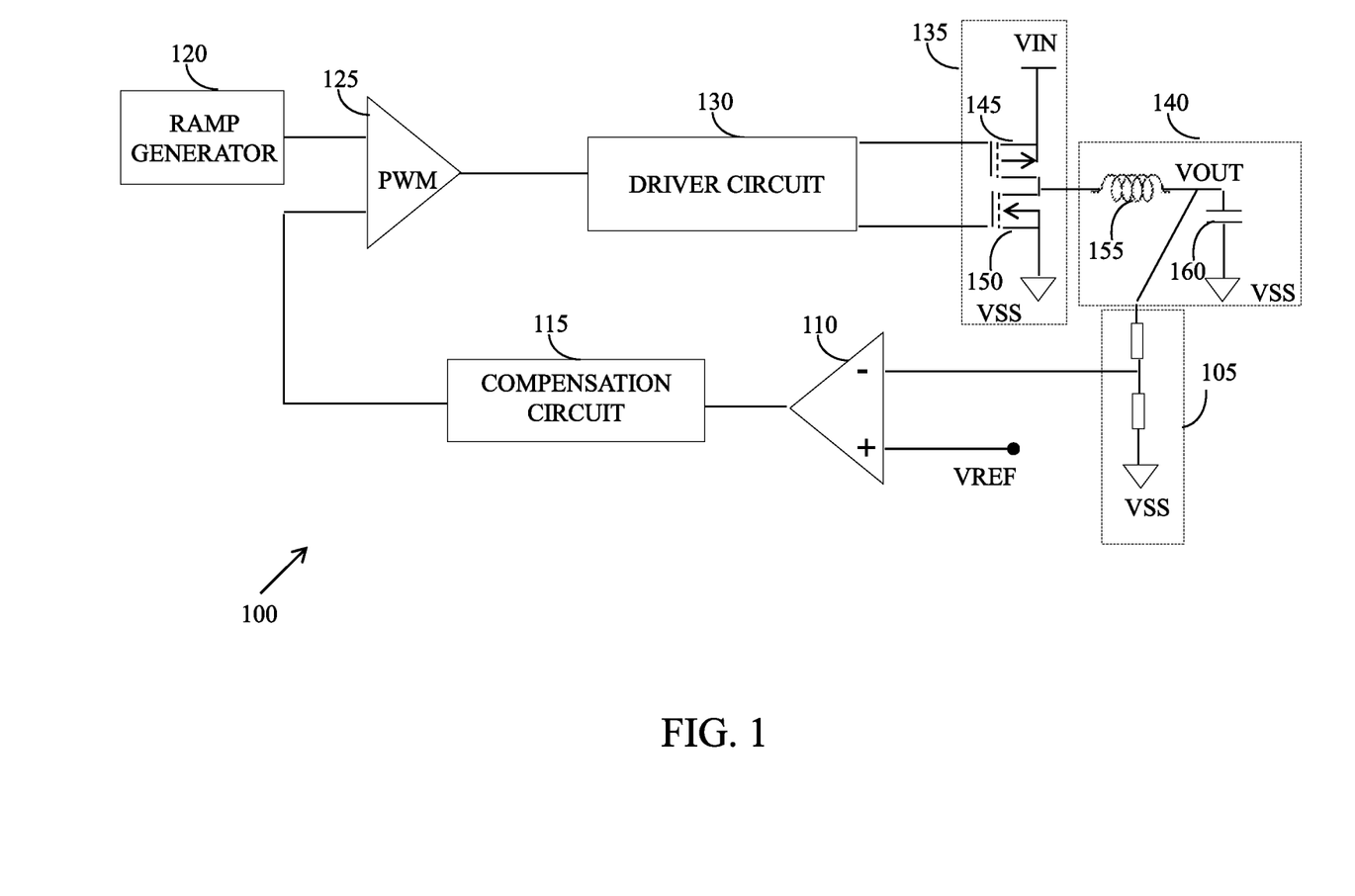
FIG. 1 is a block diagram of a spread-spectrum switching regulator, in accordance with one embodiment.

FIG. 1 is a block diagram of a spread-spectrum switching regulator 100, in accordance with one embodiment. The present disclosure is explained with reference to buck regulators, but applies to multiple switching regulators, as well as circuits which utilize a ramp to generate pulse width modulation (PWM), where final output is a function of duty cycle outputted by a PWM stage.

For example, a boost regulator has an output voltage defined as $Vout=Vin/(1-D)$—equation (i). As the duty cycle D changes due to spread spectrum modulation, Vout is also impacted. Energy storage elements, for example inductor and capacitor, add a set of double pole as well as a right half plane (RHP) zero to equation (i). However, it can still be observed that Vout is impacted by a change in the duty cycle due to the spread spectrum modulation, and it would follow response as governed by the double pole and RHP zero.

The spread-spectrum switching regulator 100 includes a voltage-divider circuit 105, a high gain amplifier 110, a compensation circuit 115, a ramp generator 120, a pulse width modulator 125, a driver circuit 130, a pair of transistors 135, and an LC circuit 140.

The pair of transistors 135 further includes a positive channel metal-oxide semiconductor (PMOS) transistor 145 and a negative channel metal-oxide semiconductor (NMOS) transistor 150. The LC circuit 140 further includes an inductor 155 and a capacitor 160.

The voltage-divider circuit 105 is coupled between the LC circuit 140 and a negative input of the high gain amplifier 110. The compensation circuit 115 is coupled between output of the high gain amplifier 110 and a second input of the pulse width modulator 125. The ramp generator 120 is coupled to a first input of the pulse width modulator 125. The driver circuit 130 is coupled between output of the pulse width modulator 125 and the pair of transistors 135. A first output of the driver circuit 130 is coupled to a gate of the PMOS transistor 145 and a second output of the driver circuit 130 is coupled to a gate of the NMOS transistor 150. A source of the PMOS transistor 145 is coupled to an input voltage supply (VIN) and a source of the NMOS transistor 150 is coupled to a ground supply (VSS). Drains of the PMOS transistor 145 and the NMOS transistor 150 are coupled to the inductor 155 of the LC circuit 140. The capacitor 160 is coupled between the inductor 155 and VSS.

An output voltage (VOUT) of the spread-spectrum switching regulator 100 is divided by the voltage-divider circuit 105 to generate a feedback voltage from a feedback loop. The feedback voltage is either VOUT or a fraction of VOUT. The feedback voltage is applied to the negative input of the high gain amplifier 110 and a reference voltage (VREF) is applied to a positive input of the high gain amplifier 110. VREF is a desired output voltage. The high gain amplifier 110 compares VREF and the feedback voltage to generate a differential voltage. The compensation circuit 115 maintains stability of the feedback loop to generate an error level voltage based on the differential voltage. The ramp generator 120 generates a ramp waveform. In some embodiments, the ramp waveform has a slope adaptable to a switching frequency (FSW) to maintain duty cycle at a constant value. In other embodiments, the ramp waveform adjusts one of the error level voltage and a pedestal voltage based on variations in switching frequency and ramp amplitude to maintain the duty cycle at the constant value. The ramp generator 120 is explained in detail in conjunction with FIG. 2

The pulse width modulator 125 switches from low to high if the ramp waveform is above the error level voltage. The pulse width modulator 125 further compares the error level voltage and the ramp waveform to generate a pulsed waveform. The error level voltage changes width of ON phase of the pulsed waveform and thereby changes the duty cycle of the pulsed waveform. The driver circuit 130 drives the pulsed waveform to alternately switch the pair of transistors 135. The LC network 140, a passive LC network, further averages the pulsed waveform to the output voltage VOUT. VOUT generated is at an approximately constant voltage level.

Figure 2:
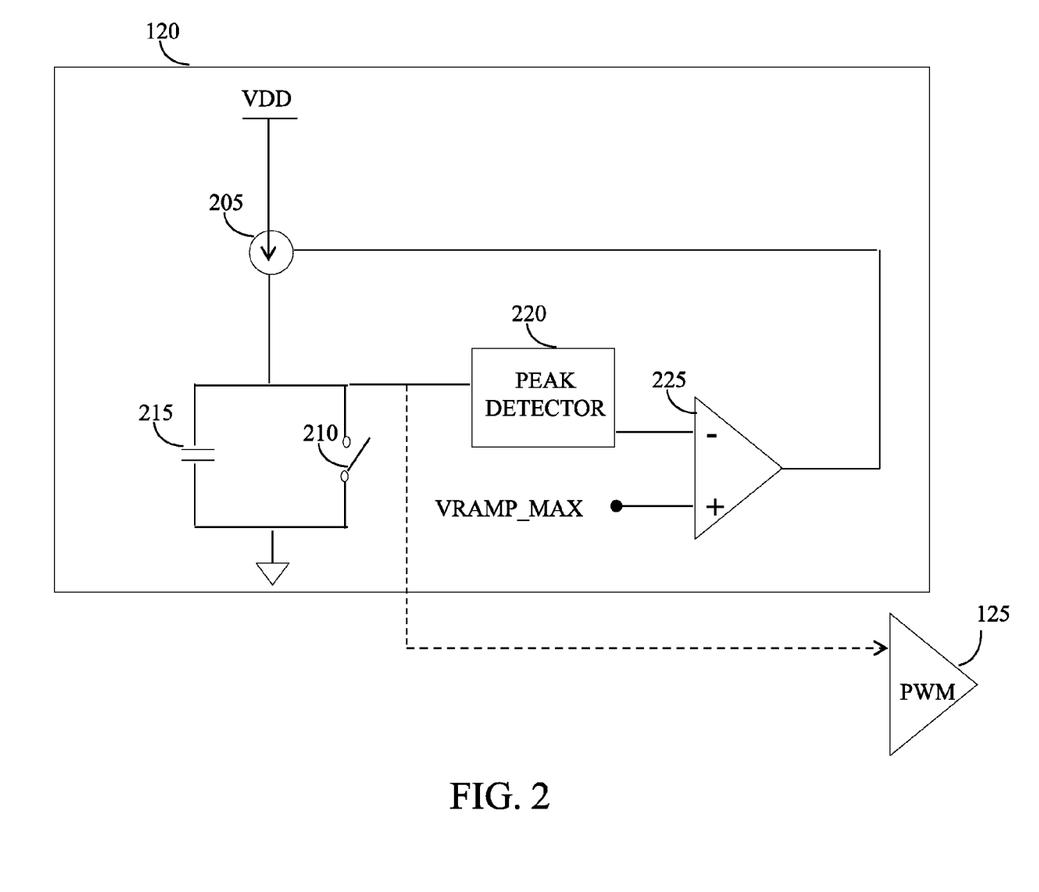
FIG. 2 is a block diagram of a ramp generator, in accordance with one embodiment.

FIG. 2 is a block diagram of the ramp generator 120, in accordance with one embodiment.

The ramp generator 120 includes a controlled current source 205, a switch 210, a capacitor 215, a peak detector 220, and a comparator 225.

The controlled current source 205, for example a voltage controlled current source, is coupled between a power supply (VDD) and a first terminal of the switch 210. A second terminal of the switch 210 is coupled to VSS. The capacitor 215 is coupled between the controlled current source 205 and VSS. The capacitor 215 is also in parallel connection with the switch 210. The peak detector 220 is coupled between the first terminal of the switch 210 and a negative input of the comparator 225. Output of the comparator 225 is coupled to the controlled current source 205. Input to the peak detector 220 is further coupled to the pulse width modulator 125.

A current is generated using the controlled current source 205. The controlled current source 205 is controlled using the comparator 225. The switch 210 is closed at the switching frequency. The switching frequency is a variable frequency that varies between (Fsw−δFsw) and (Fsw+δFsw). The capacitor 215 is charged, by the controlled current source 205, when the switch 210 is open to generate the ramp waveform. Charging of the capacitor 215 produces a ramp-up in voltage of the ramp waveform. The peak detector 220 then detects a peak voltage of the ramp waveform. The comparator 225 compares the peak voltage with a maximum ramp voltage (VRAMP_MAX) that is allowed to generate a feedback signal to the controlled current source 205. The feedback signal enables the controlled current source 205 to reduce the current if the maximum ramp voltage is crossed. Hence, regardless of variations in the switching frequency, amplitude of the ramp waveform does not exceed maximum amplitude of the ramp waveform or R. The duty cycle is thereby maintained at the constant value.

The duty cycle D can be expressed in terms of operating values in equation (1) below:

$$D=(P-E+R)/R \quad (1)$$

where P is pedestal voltage (lower limit of the ramp-waveform), E is the error level voltage at which the pulse width modulator 125 switches on, and R is ramp voltage or a maximum ramp amplitude. A change in Fsw causes a change in R. Changes in the duty cycle D that is caused by changes in P, E, or R is given in equation (2) below:

$$d=\{p+r(1-D)-e\}/R \quad (2)$$

where d, p, e and r represent a limited amount of changes respectively in D, P, E and R.

Figure 3:
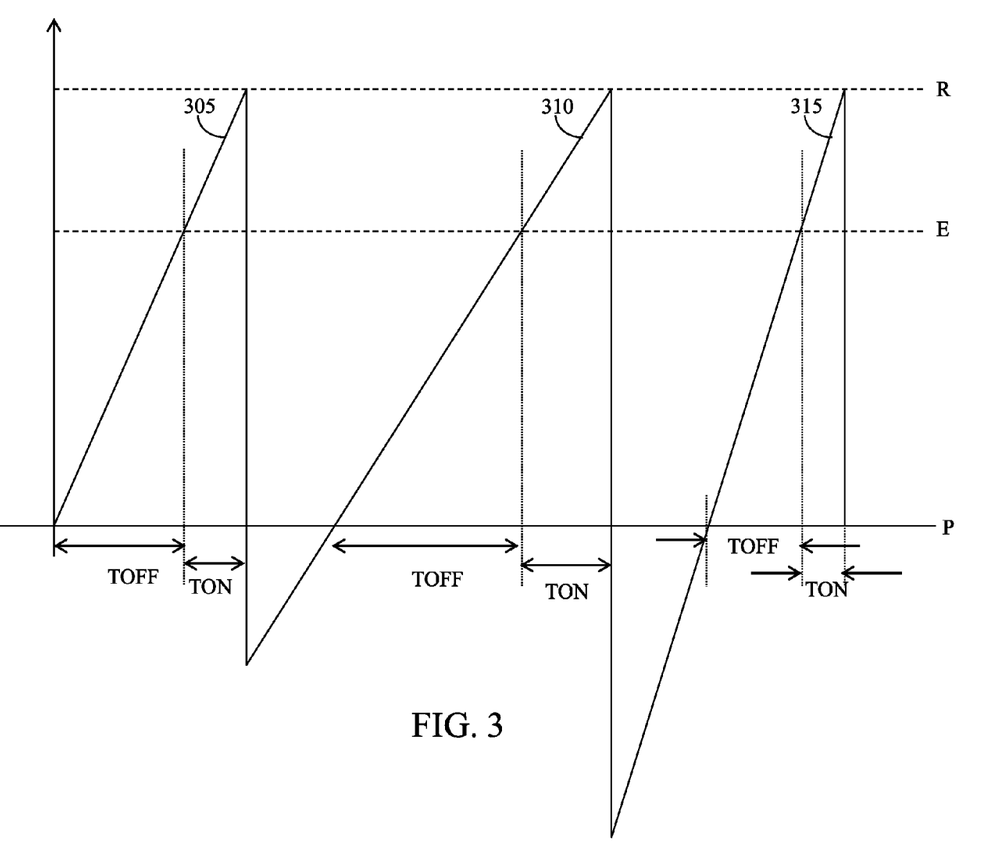
FIG. 3 is an exemplary illustration of a ramp waveform with slope adaptable to switching frequency to maintain duty cycle at a constant value, in accordance with one embodiment.

FIG. 3 is an exemplary illustration of a ramp waveform with slope adaptable to switching frequency to maintain duty cycle at a constant value, in accordance with one embodiment. The duty cycle (D) is defined as a ratio of on-time (TON) to time period (T). T is sum of the on-time and off-time (TOFF) and is also reciprocal of switching frequency (Fsw). X axis represents the duty cycle with TON and TOFF in seconds (s) and Y axis represents ramp voltage (R), error level voltage (E), and pedestal voltage (P) in volts (V).

A waveform 305 is a ramp waveform with a slope corresponding to the switching frequency (Fsw) at a nominal value. When the switching frequency changes from FSw to a below nominal value of (FSw−δFSw), TON and TOFF increase correspondingly and the slope is adjusted such that the maximum amplitude of the ramp waveform or R is held at a constant level and there are no changes in E and P. The duty cycle is hence maintained at the constant value even with changes in TON and TOFF. A waveform 310 is the ramp waveform with the slope corresponding to the switching frequency (FSw−δFSw) at the below nominal value. When the switching frequency changes from FSw to an above nominal value of (FSw+δFSw), TON and TOFF decrease correspondingly and the slope is adjusted such that maximum amplitude of the ramp waveform or R is held at a constant level and there are no changes in E and P. The duty cycle is hence maintained at the constant value even with changes in TON and TOFF. A waveform 315 is the ramp waveform with the slope corresponding to the switching frequency (FSw+δFSw) at the above nominal value. Hence, by adjusting the slope of the ramp waveform in accordance to changes in the switching frequency, modulation ripple is eliminated while also preserving high spur-free dynamic range (SFDR) achieved by spread spectrum switching regulation.

Figure 4:
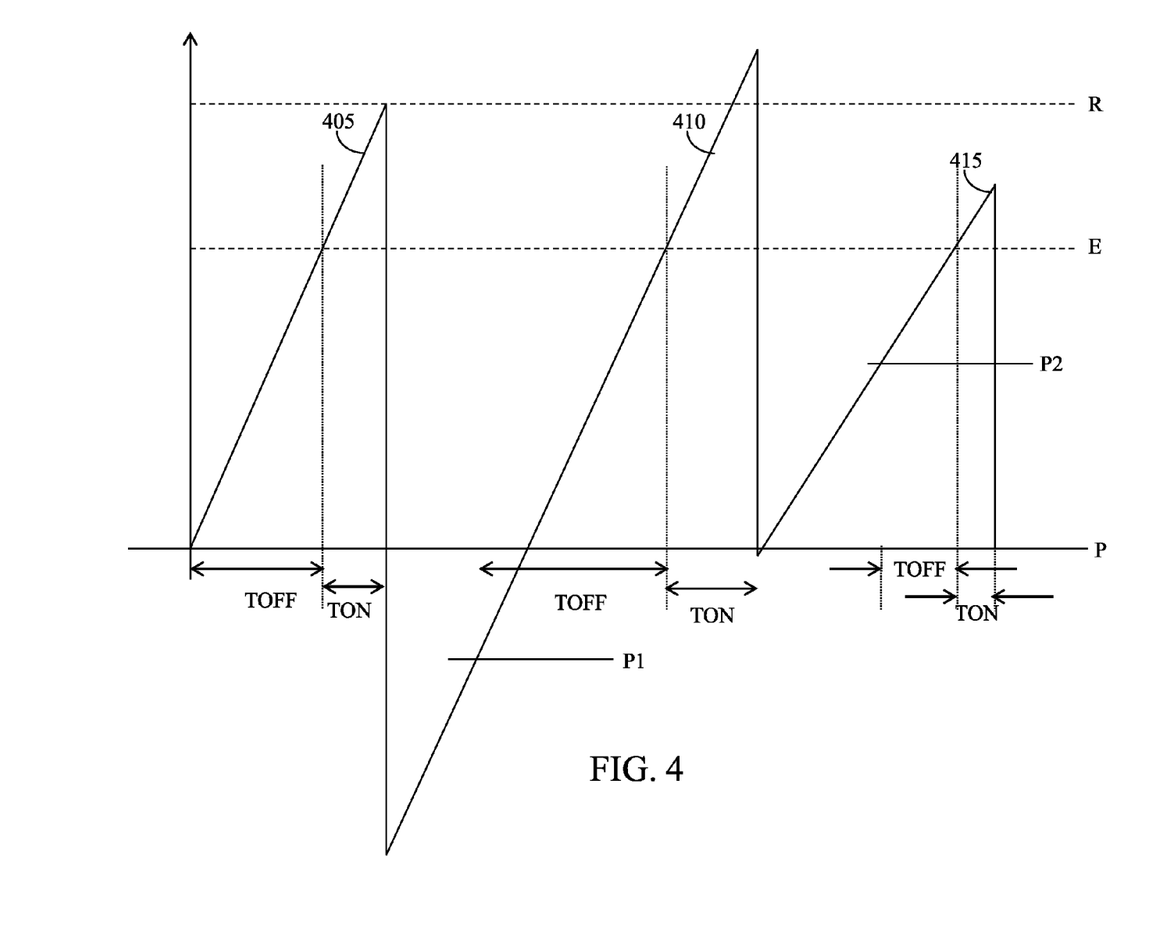
FIG. 4 is an exemplary illustration of a ramp waveform having pedestal voltage adjustable to maintain duty cycle at a constant value, in accordance with one embodiment.

FIG. 4 is an exemplary illustration of a ramp waveform having pedestal voltage adjustable to maintain duty cycle at a constant value, in accordance with one embodiment. X axis represents the duty cycle (D) with TON and TOFF in seconds (s) and Y axis represents ramp voltage (R), error level voltage (E), and pedestal voltage (P) in volts (V).

A waveform 405 is a ramp waveform corresponding to the switching frequency (FSw) at a nominal value. When the switching frequency changes from FSw to a below nominal value of (FSw−δFSw), TON and TOFF increase correspondingly. Amplitude of the ramp waveform or R increases with no change in E. However, even with changes in TON, TOFF, and R, the duty cycle is maintained at the constant value by reducing the pedestal voltage P to P1. A waveform 410 is the ramp waveform with reduced pedestal voltage P1 corresponding to the switching frequency (FSw−δFSw) at the below nominal value. When the switching frequency changes from FSw to an above nominal value of (FSw+δFSw), TON and TOFF decrease correspondingly. Amplitude of the ramp waveform or R decreases with no change in E. However, even with changes in TON, TOFF, and R, the duty cycle is maintained at the constant value by increasing the pedestal voltage P to P2. A waveform 415 is the ramp waveform with increased pedestal voltage P2 corresponding to the switching frequency (FSw+δFSw) at the above nominal value. Hence, by compensating the pedestal voltage of the ramp waveform in accordance to changes in the switching frequency, modulation ripple is eliminated while also preserving high SFDR achieved by spread spectrum switching regulation.

In one example, if change in E, represented as e, is set to zero, then a change r in the ramp voltage R can be compensated by setting change in P, represented as p, to p=−r(1−D). D is hence maintained at the constant value.

Figure 5:
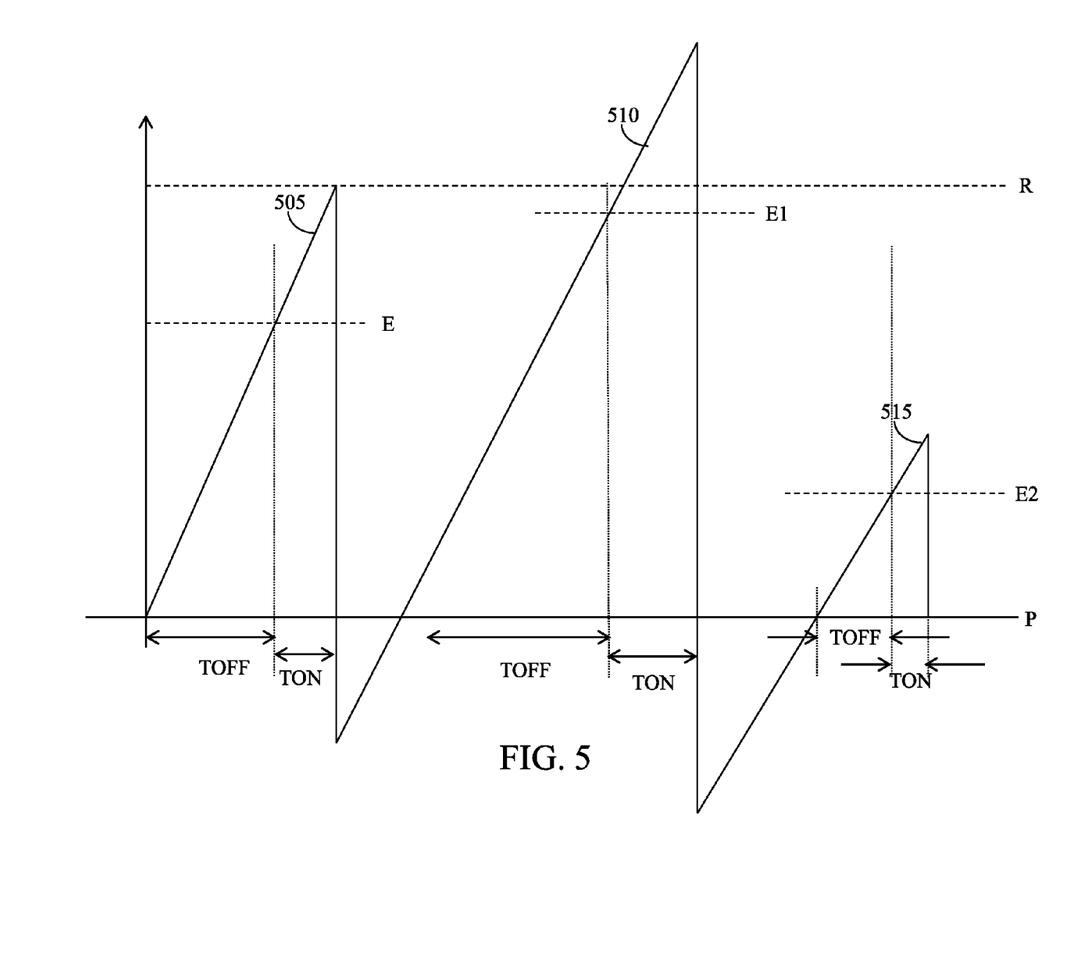
FIG. 5 is an exemplary illustration of a ramp waveform having error level voltage adjustable to maintain duty cycle at a constant value, in accordance with one embodiment.

FIG. 5 is an exemplary illustration of a ramp waveform having error level voltage adjustable to maintain duty cycle at a constant value, in accordance with one embodiment. X axis represents the duty cycle (D) with TON and TOFF in seconds (s) and Y axis represents ramp voltage (R), error level voltage (E), and pedestal voltage (P) in volts (V).

A waveform 505 is a ramp waveform corresponding to the switching frequency (FSw) at a nominal value. When the switching frequency changes from FSw to a below nominal value of (FSw−δFSw), TON and TOFF increase correspondingly. Amplitude of the ramp waveform or R increases with no change in P. However, even with changes in TON, TOFF, and R, the duty cycle is maintained at the constant value by increasing the error level voltage E to E1. A waveform 510 is the ramp waveform with increased error level voltage E1 corresponding to the switching frequency (FSw−δFSw) at the below nominal value. When the switching frequency changes from FSw to an above nominal value of (FSw+δFSw), TON and TOFF decrease correspondingly. Amplitude of the ramp waveform or R decreases with no change in P. However, even with changes in TON, TOFF, and R, the duty cycle is maintained at the constant value by reducing the error level voltage E to E2. A waveform 515 is the ramp waveform with reduced error level voltage E2 corresponding to the switching frequency (FSw+δFSw) at the above nominal value. Hence, by compensating the error level voltage of the ramp waveform in accordance to changes in the switching frequency, modulation ripple is eliminated while also preserving high SFDR achieved by spread spectrum switching regulation.

In one example, if p is set to zero, then r can be compensated by setting e to e=r(1−D). D is hence maintained at the constant value.

Figure 6:
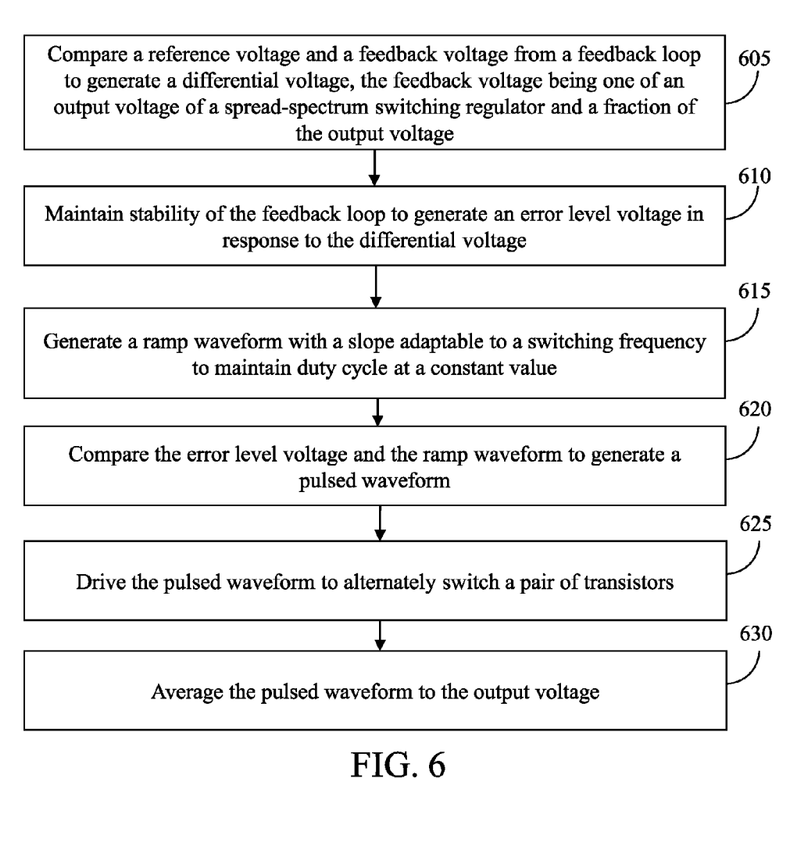
FIG. 6 is a flow diagram illustrating a method of eliminating modulation ripple in a spread-spectrum switching regulator, in accordance with one embodiment.

FIG. 6 is a flow diagram illustrating a method of eliminating modulation ripple in a spread-spectrum switching regulator, for example the spread-spectrum switching regulator 100, in accordance with one embodiment. In one example, the spread-spectrum switching regulator 100 is a buck converter.

At step 605, a reference voltage (VREF) and a feedback voltage from a feedback loop are compared to generate a differential voltage. The feedback voltage is either an output voltage of the spread-spectrum switching regulator or a fraction of the output voltage. The reference voltage and the feedback voltage are compared using a high gain amplifier, for example the high gain amplifier 110. The feedback voltage is provided by a voltage-divider circuit, for example the voltage-divider circuit 105.

At step 610, stability of the feedback loop is maintained to generate an error level voltage in response to the differential voltage. The stability of the feedback loop is maintained by a compensation circuit, for example the compensation circuit 115.

At step 615, a ramp waveform with a slope adaptable to a switching frequency is generated to maintain duty cycle at a constant value. The ramp waveform can be generated by a ramp generator, for example the ramp generator 120.

At step 620, the error level voltage and the ramp waveform are compared to generate a pulsed waveform. The pulsed waveform is generated using a pulse width modulator, for example the pulse width modulator 125.

At step 625, the pulsed waveform is driven to alternately switch a pair of transistors, for example the pair of transistors 135. The pulsed waveform is driven by a driver circuit, for example the driver circuit 130.

In some embodiments, the pair of transistors include a positive channel metal-oxide semiconductor (PMOS) transistor, for example the PMOS 145, and a negative channel metal-oxide semiconductor (NMOS) transistor, for example the NMOS 150.

At step 630, the pulsed waveform is averaged to the output voltage by an LC network, for example the LC network 140.

Figure 7:
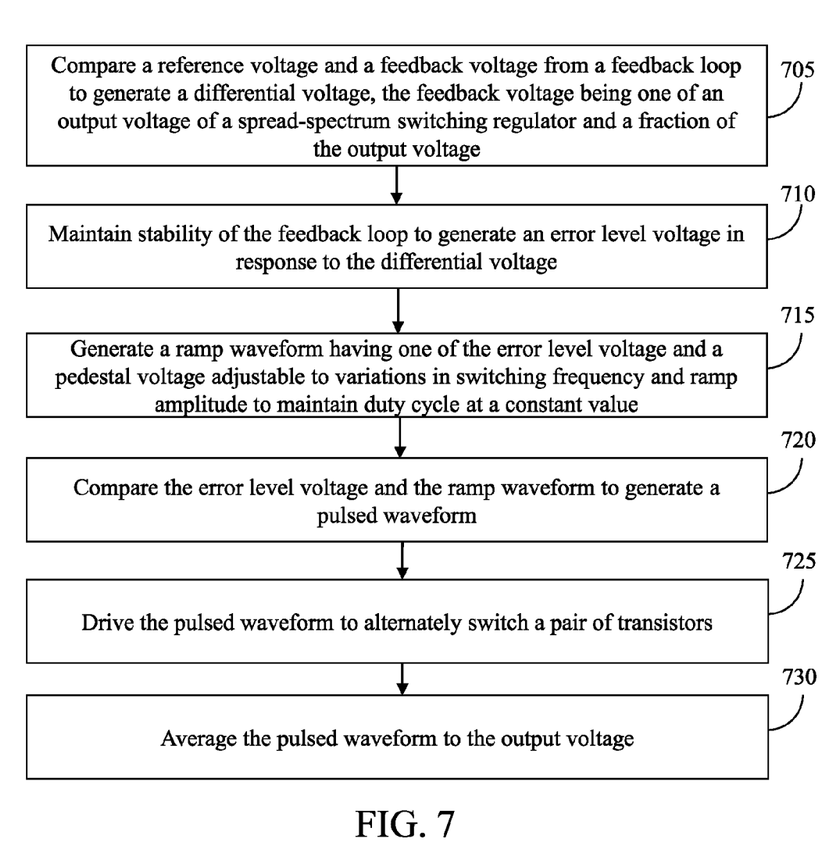
FIG. 7 is a flow diagram illustrating a method of eliminating modulation ripple in a spread-spectrum switching regulator, in accordance with another embodiment.

FIG. 7 is a flow diagram illustrating a method of eliminating modulation ripple in a spread-spectrum switching regulator, for example the spread-spectrum switching regulator 100, in accordance with another embodiment. In one example, the spread-spectrum switching regulator 100 is a buck converter.

At step 705, a reference voltage (VREF) and a feedback voltage from a feedback loop are compared to generate a differential voltage. The feedback voltage is either an output voltage of the spread-spectrum switching regulator or a fraction of the output voltage. The reference voltage and the feedback voltage are compared using a high gain amplifier, for example the high gain amplifier 110. The feedback voltage is provided by a voltage-divider circuit, for example the voltage-divider circuit 105.

At step 710, stability of the feedback loop is maintained to generate an error level voltage in response to the differential voltage. The stability of the feedback loop is maintained by a compensation circuit, for example the compensation circuit 115.

At step 715, a ramp waveform having one of the error level voltage and a pedestal voltage adjustable to variations in switching frequency and ramp amplitude is generated to maintain duty cycle at a constant value. The ramp waveform can be generated by a ramp generator, for example the ramp generator 120.

At step 720, the error level voltage and the ramp waveform are compared to generate a pulsed waveform. The pulsed waveform is generated using a pulse width modulator, for example the pulse width modulator 125.

At step 725, the pulsed waveform is driven to alternately switch a pair of transistors, for example the pair of transistors 135. The pulsed waveform is driven by a driver circuit, for example the driver circuit 130.

In some embodiments, the pair of transistors include a positive channel metal-oxide semiconductor (PMOS) transistor, for example the PMOS 145, and a negative channel metal-oxide semiconductor (NMOS) transistor, for example the NMOS 150.

At step 730, the pulsed waveform is averaged to the output voltage by an LC network, for example the LC network 140.

In the present disclosure, the spread-spectrum switching regulator 100 eliminates modulation ripple thereby providing a desired output voltage. The spur-free dynamic range (SFDR) is hence increased. Further, the duty cycle is maintained at a constant value by the ramp generator even with changes in the switching frequency. The present disclosure further enables spread spectrum at frequencies higher than bandwidth of the spread-spectrum switching regulator 100.

In the foregoing discussion, the term "coupled or connected" refers to either a direct electrical connection or mechanical connection between the devices connected or an indirect connection through intermediary devices. The term "circuit" means at least either a single component or a multiplicity of components, either active or passive, that are connected together to provide a desired function.

The foregoing description sets forth numerous specific details to convey a thorough understanding of embodiments of the disclosure. However, it will be apparent to one skilled in the art that embodiments of the disclosure may be practiced without these specific details. Some well-known features are not described in detail in order to avoid obscuring the disclosure. Other variations and embodiments are possible in light of above teachings, and it is thus intended that the scope of disclosure not be limited by this Detailed Description, but only by the Claims.

We claim:

1. A spread-spectrum switching regulator for eliminating modulation ripple, the spread-spectrum switching regulator comprising:
 a high gain amplifier that is responsive to a reference voltage and a feedback voltage from a feedback loop to generate a differential voltage, the feedback voltage being one of an output voltage of the spread-spectrum switching regulator or a fraction of the output voltage;
 a compensation circuit, coupled to the high gain amplifier, that maintains stability of the feedback loop to generate an error level voltage in response to the differential voltage;
 a ramp generator that generates a ramp waveform with a slope adaptable to a switching frequency to maintain duty cycle at a constant value, wherein the ramp generator further comprises:
  a controlled current source that generates a current;
  a switch, coupled to the controlled current source, that is closed at the switching frequency;
  a capacitor, coupled to the controlled current source and the switch, that is charged when the switch is open to generate the ramp waveform;
  a peak detector, coupled to the controlled current source and the switch, that detects a peak voltage of the ramp waveform caused by a change in switching frequency; and
  a comparator, coupled between the peak detector and the controlled current source, that compares the peak voltage with a maximum ramp voltage to generate a feedback signal to the controlled current source;
 a pulse width modulator, coupled to the compensation circuit and the ramp generator, that compares the error level voltage and the ramp waveform to generate a pulsed waveform;
 a driver circuit, coupled to the pulse width modulator, that drives the pulsed waveform to alternately switch a pair of transistors; and
 an LC network, coupled to the pair of transistors, to average the pulsed waveform to the output voltage.

2. The spread-spectrum switching regulator as claimed in claim 1 and further comprising
 a voltage-divider circuit, coupled between a negative input of the high gain amplifier and the LC network, that divides the output voltage to provide the feedback voltage.

3. The spread-spectrum switching regulator as claimed in claim 1, wherein the error level voltage is varied to vary the duty cycle of the pulsed waveform.

4. The spread-spectrum switching regulator as claimed in claim 1, wherein the switching frequency is a variable frequency.

5. The spread-spectrum switching regulator as claimed in claim 1, wherein the feedback signal enables the controlled current source to reduce the current if the maximum ramp voltage is crossed.

6. A spread-spectrum switching regulator for eliminating modulation ripple, the spread-spectrum switching regulator comprising:
 a high gain amplifier that is responsive to a reference voltage and a feedback voltage from a feedback loop to generate a differential voltage, the feedback voltage being one of an output voltage of the spread-spectrum switching regulator or a fraction of the output voltage;
 a compensation circuit, coupled to the high gain amplifier, that maintains stability of the feedback loop to generate an error level voltage in response to the differential voltage;
 a ramp generator that generates a ramp waveform having one of the error level voltage and a pedestal voltage, wherein the error level voltage and the pedestal voltage are adjustable to variations in switching frequency and ramp amplitude so as to maintain duty cycle at a constant value, wherein the ramp generator further comprises:
  a controlled current source that generates a current;
  a switch, coupled to the controlled current source, that is closed at the switching frequency;
  a capacitor, coupled to the controlled current source and the switch, that is charged when the switch is open to generate the ramp waveform;
  a peak detector, coupled to the controlled current source and the switch, that detects a peak voltage of the ramp waveform caused by a change in switching frequency; and
  a comparator, coupled between the peak detector and the controlled current source, that compares the peak voltage with a maximum ramp voltage to generate a feedback signal to the controlled current source;
 a pulse width modulator, coupled to the compensation circuit and the ramp generator, that compares the error level voltage and the ramp waveform to generate a pulsed waveform;
 a driver circuit, coupled to the pulse width modulator, that drives the pulsed waveform to alternately switch a pair of transistors; and
 an LC network, coupled to the pair of transistors, to average the pulsed waveform to the output voltage.

7. The spread-spectrum switching regulator as claimed in claim 6 and further comprising
 a voltage-divider circuit, coupled between a negative input of the high gain amplifier and the LC network, that divides the output voltage to provide the feedback voltage.

8. The spread-spectrum switching regulator as claimed in claim 6, wherein the error level voltage is varied to vary the duty cycle of the pulsed waveform.

9. The spread-spectrum switching regulator as claimed in claim 6, wherein the switching frequency is a variable frequency.

10. The spread-spectrum switching regulator as claimed in claim 6, wherein the feedback signal enables the controlled current source to reduce the current if the maximum ramp voltage is crossed.

11. A method of eliminating modulation ripple in a spread-spectrum switching regulator, the method comprising:
 comparing a reference voltage and a feedback voltage from a feedback loop to generate a differential voltage, the feedback voltage being one of an output voltage of the spread-spectrum switching regulator or a fraction of the output voltage;
 maintaining stability of the feedback loop to generate an error level voltage in response to the differential voltage;
 generating a ramp waveform with a slope adaptable to a switching frequency to maintain duty cycle at a constant value, wherein generating the ramp waveform further comprises:
  generating a current;
  charging a capacitor when a switch is open to generate the ramp waveform;
  detecting a peak voltage of the ramp waveform caused by a change in switching frequency; and comparing the peak voltage with a maximum ramp voltage to generate a feedback signal;
comparing the error level voltage and the ramp waveform to generate a pulsed waveform;
driving the pulsed waveform to alternately switch a pair of transistors; and
averaging the pulsed waveform to the output voltage.

12. The method as claimed in claim 11, wherein the error level voltage is modulated to vary the duty cycle of the pulsed waveform.

13. The method as claimed in claim 11, wherein the switching frequency is a variable frequency.

14. The method as claimed in claim 11, wherein the feedback signal enables reduction in the current if the maximum ramp voltage is crossed.

15. A method of eliminating modulation ripple in a spread-spectrum switching regulator, the method comprising:
comparing a reference voltage and a feedback voltage from a feedback loop to generate a differential voltage, the feedback voltage being one of an output voltage of the spread-spectrum switching regulator or a fraction of the output voltage;
maintaining stability of the feedback loop to generate an error level voltage in response to the differential voltage;
generating a ramp waveform having the error level voltage and a pedestal voltage, wherein the error level voltage and the pedestal voltage are adjustable to variations in switching frequency and ramp amplitude so as to maintain duty cycle at a constant value, wherein generating the ramp waveform further comprises:
generating a current;
charging a capacitor when a switch is open to generate the ramp waveform;
detecting a peak voltage of the ramp waveform caused by a change in switching frequency; and
comparing the peak voltage with a maximum ramp voltage to generate a feedback signal;
comparing the error level voltage and the ramp waveform to generate a pulsed waveform;
driving the pulsed waveform to alternately switch a pair of transistors; and
averaging the pulsed waveform to the output voltage.

16. The method as claimed in claim 15, wherein the error level voltage is varied to vary the duty cycle of the pulsed waveform.

17. The method as claimed in claim 15, wherein the switching frequency is a variable frequency.

18. The method as claimed in claim 15, wherein the feedback signal enables reduction in the current if the maximum ramp voltage is crossed.

* * * * *